US009485173B2

(12) United States Patent
Chunduri et al.

(10) Patent No.: US 9,485,173 B2
(45) Date of Patent: Nov. 1, 2016

(54) OPTIMIZATION TO EXPAND IS-IS LEAF NODES DURING LFA COMPUTATION

(71) Applicant: Telefonaktiebolaget L M Ericsson (publ), Stockholm (SE)

(72) Inventors: Uma S. Chunduri, Fremont, CA (US); Wenhu Lu, San Jose, CA (US); Vasant Patil, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 134 days.

(21) Appl. No.: 14/304,656

(22) Filed: Jun. 13, 2014

(65) Prior Publication Data

US 2015/0365271 A1   Dec. 17, 2015

(51) Int. Cl.
| | |
|---|---|
| H04L 12/50 | (2006.01) |
| H04L 12/28 | (2006.01) |
| H04L 12/56 | (2006.01) |
| H04L 12/703 | (2013.01) |
| H04L 12/705 | (2013.01) |
| H04L 12/707 | (2013.01) |
| H04L 12/721 | (2013.01) |

(52) U.S. Cl.
CPC .............. *H04L 45/28* (2013.01); *H04L 45/18* (2013.01); *H04L 45/22* (2013.01); *H04L 45/741* (2013.01); *H04L 45/12* (2013.01)

(58) Field of Classification Search
CPC .. H04Q 11/04; H04Q 11/0478; H04L 45/00; H04L 45/745
See application file for complete search history.

(56) References Cited

U.S. PATENT DOCUMENTS

| | | | |
|---|---|---|---|
| 7,719,960 B2 | 5/2010 | Atlas et al. | |
| 8,264,949 B2 | 9/2012 | Ravindran et al. | |
| 8,892,772 B1 * | 11/2014 | Filsfils | H04L 45/28 709/238 |
| 2013/0259056 A1 * | 10/2013 | Kotrabasappa | H04L 45/24 370/401 |
| 2013/0301403 A1 * | 11/2013 | Esale | H04L 45/16 370/221 |
| 2014/0219209 A1 * | 8/2014 | Soneda | H04W 40/30 370/329 |
| 2015/0016242 A1 * | 1/2015 | Ernstrom | H04L 45/122 370/218 |
| 2015/0171059 A1 * | 6/2015 | Hu | H01L 25/0753 257/88 |
| 2015/0222545 A1 * | 8/2015 | Sarkar | H04L 45/122 370/238 |
| 2015/0271052 A1 * | 9/2015 | Chunduri | H04L 45/122 370/400 |
| 2015/0271056 A1 * | 9/2015 | Chunduri | H04L 45/02 370/238 |

OTHER PUBLICATIONS

"Understanding and Deploying Loop-Free Alternate Feature, Theoretical Overview and Operational Examples of Loop-Free Alternates in the Junos OS", 2009, 20 pages, *Juniper Networks, Inc.*

(Continued)

*Primary Examiner* — Brian Roberts
*Assistant Examiner* — Abu-Sayeed Haque
(74) *Attorney, Agent, or Firm* — Nicholson De Vos Webster & Elliott, LLP

(57) ABSTRACT

A method and system implemented by a network device, where the network device is in a network having a plurality of nodes. The method computes a loop free alternative (LFA) next hop as a backup for a primary path next hop for intermediate system-intermediate system (IS-IS). The method improves LFA computation efficiency by minimizing expansion of prefixes. The method includes expanding all prefixes of the next LFA shortest path first (SPF) destination node and inheriting a next candidate next hop as a current LFA next hop where the next candidate next hop provides link or node protection and better protection than the current LFA next hop.

17 Claims, 7 Drawing Sheets

(56) References Cited

OTHER PUBLICATIONS

Ala, Abdelali, et al., "Core Backbone Convergence Mechanisms and Microloops Analysis", 2012, pp. 10-22, (*IJACSA*) *International Journal of Advanced Computer Science and applications*, vol. 3, No. 7.
Atlas, A., et al., "Basic Specification for IP Fast Reroute; Loop-Free Alternates", *Network Working Group, RFC 5286, Standards Track*, Sep. 2008, 32 pages., 32.
Callon, R., et al., "Use of OSI IS-IS for routing in TCP/IP and Dual Environments", *RFC 1195*; Dec. 1990; http://tools.ietf.org/rfc/rfc1195.txt; 80 pages.
Ali, et al., "Node-ID Based Resource Reservation Protocol (RSVP) Hello: A Clarification Statement", Network Working Group, Network Working Group, Request for Comments: 4558, The Internet Society, (Jun. 2006), 7 pages.
Andersson, L., et al., "LDP Specification", Network Working Group; RFC 5036; Oct. 2007; 135 pages.
Awduche, et al., "RSVP-TE: Extensions to RSVP for LSP Tunnels", Network Working Group Request for Comments: 3209, Dec. 2001, 61 pages, The Internet Society.
Babiarz, J., et al., "Configuration Guidelines for DiffServ Service Classes", Network Working Group, Request for Comments: 4594, The Internet Society, (Aug. 2006), 57 pages.
Baker, F., et al., "A Differentiated Services Code Point (DSCP) for Capacity-Admitted Traffic", Internet Engineering Task Force (IETF); RFC 5865; May 2010; 14 pages.
Baker, F., et al., "Management Information Base for the Differentiated Services Architecture", Network Working Group, Request for Comments: 3289, The Internet Society, (May 2002), 116 pages.
Berger, L., "Generalized Multi-Protocol Label Switching (GMPLS) Signaling Resource ReserVation Protocol—Traffic Engineering (RSVP-TE)", Network Working Group; RFC 3473; Jan. 2003; 42 pages.
Bernet, Y., et al., "An Informal Management Model for Diffserv Routers", Network Working Group, Request for Comments: 3290, The Internet Society, (May 2002), 56 pages.
Black, D., et al., "Per Hop Behavior Identification Codes," Jun. 2001, 8 pages, Network Working Group, Request for Comments: 3140, The Internet Society.
Black, D., "Differentiated Services and Tunnels", Network Working Group, Request for Comments: 2983, The Internet Society, (Oct. 2000), 14 pages.
Blake, S., et al., "An Architecture for Differentiated Services," Dec. 1998, 36 pages, Network Working Group, Request for Comments: 2475, The Internet Society.
Borman, D., et al., "IPv6 Jumbograms", Network Working Group, Request for Comments: 2675, The Internet Society, (Aug. 1999), 9 pages.
Braden, R., et al., "Resource ReSerVation Protocol (RSVP) Version 1 Functional Specification", Network Working Group, Request for Comment: 2205, Sep. 1997, 112 pages.
Chan, K., et al., "Differentiated Services Quality of Service Policy Information Base", Network Working Group, Request for Comments: 3317, The Internet Society, (Mar. 2003), 96 pages.
Charny, A., et al., "Supplemental Information for the New Definition of the EF PHB (Expedited Forwarding Per-Hop Behavior)", Network Working Group, Request for Comments: 3247, The Internet Society, (Mar. 2002), 24 pages.
Coltun, R., et al., "OSPF for IPv6", Network Working Group, Request for Comment: 5340, Jul. 2008, 94 pages.
Davie, B., et al., "An Expedited Forwarding PHB (Per-Hop Behavior)", Network Working Group, Request for Comments: 3246, The Internet Society, (Mar. 2002), 16 pages.
Deering, et al., "Internet Protocol, Version 6 (IPv6) Specification", Network Working Group, Request for Comments: 2460, The Internet Society, (Dec. 1998), 39 pages.
Eggert, L., et al., "Unicast UDP Usage Guidelines for Application Designers," Nov. 2008, 27 pages, Network Working Group, Request for Comments: 5405, IETF Trust and the persons identified as the document authors.
Fenner, B., et al., "Management information base for the user datagram protocol (UDP)", Network Working Group, Request for Comment: 4113, Jun. 2005, 19 pages.
Grossman, D., "New Terminology and Clarifications for Diffserv", Network Working Group, Request for Comments: 3260, The Internet Society, (Apr. 2002), 10 pages.
Hedrick, C., "Routing Information Protocol", Network Working Group, Request for Comments: 1058, (Jun. 1988), 34 pages.
Heinanen, J., et al., "Assured Forwarding PHB Group," Jun. 1999, 11 pages, Network Working Group, Request for Comments: 2597, The Internet Society.
Hopps, C., "Analysis of an Equal-Cost Multi-Path Algorithm", Network Working Group, Request for Comments: 2992, The Internet Society, (Nov. 2000), 8 pages.
Housley, R., et al., "Using Advanced Encryption Standard (AES) CCM Mode with IPsec Encapsulating Security Payload (ESP)", Network Working Group; RFC 4309; Dec. 2005; 13 pages.
Information Sciences Institute, University of Southern C., "Transmission control protocol darpa internet program protocol specification", Sep. 1981, Request for Comments: 793, 91 pages.
Kent, S., et al., "Security Architecture for the Internet Protocol," Dec. 2005, 101 pages, Network Working Group, Request for Comments: 4301, The Internet Society.
Kompella, et al., "Procedures for Modifying the Resource reSerVation Protocol (RSVP)", Network Working Group, Request for Comments: 3936, The Internet Society, (Oct. 2004), 7 pages.
Malkin, G., "RIP Version 2", Network Working Group, Request for Comment: 2453, Nov. 1998, 39 pages.
Malkin, G., et al., "RIPng for IPv6", Network Working Group; RFC 2080; Jan. 1997; 19 pages.
Moy, J., ""OSPF Version 2,"", Apr. 1998, 244 pages, Network Working Group, Request for Comments 2328, The Internet Society.
Nichols, K., et al., "Definition of Differentiated Services Per Domain Behaviors and Rules for their Specification," Apr. 2001, 24 pages, Network Working Group, Request for Comments: 3086, The Internet Society.
Nichols, K., et al., "Definition of the Differentiated Services Field (DS Field) in the IPv4 and IPv6 Headers", Network Working Group, Request for Comments: 2474, The Internet Society, (Dec. 1998), 20 pages.
Oran, David, "OSI ISIS Intradomain Routing Protocol", Network Working Group, Request for Comments: 1142, (Feb. 1990), 157 pages.
Polk, et al., "A Resource Reservation Protocol (RSVP) Extension for the Reduction of Bandwidth of a Reservation Flow", Network Working Group, Request for Comments: 4495, The Internet Society, (May 2006), 21 pages.
Postel, J., "User Datagram Protocol," Aug. 28, 1980, 3 pages, RFC: 768.
Rekhter, Y., et al., "A Border Gateway Protocol 4 (BGP-4)", Network Working Group; RFC 4271; Jan. 2006; 104 pages.
Rosen, et al., "BGP/MPLS IP Virtual Private Networks (VPNs)", Network Working Group, Request for Comments: 4364, The Internet Society, (Feb. 2006), 47 pages.
Shenker, et al., "Specification of Guaranteed Quality of Service", Network Working Group, Request for Comments: 2212, (Sep. 1997), 20 pages.
Socolofsky, T., et al., "A TCP/IP Tutorial", Network Working Group, Request for Comments: 1180, (Jan. 1991), 28 pages.
Thaler, et al., "Multipath Issues in Unicast and Multicast Next-Hop Selection", Network Working Group, Request for Comments: 2991, The Internet Society, (Nov. 2000), 9 pages.
Wroclawski, J., "Specification of the Controlled-Load Network Element Service", Network Working Group, Request for Comments: 2211, (Sep. 1997), 19 pages.
Wroclawski, J., "The Use of RSVP with IETF Integrated Services", Network Working Group, Request for Comments: 2210, (Sep. 1997), 33 pages.
ISO/IEC 10589:2002: International Standard, "Information technology—Telecommunications and information exchange between systems—Intermediate System to Intermediate System intra-domain routeing information exchange protocol for use in conjunction with the protocol for providing the connectionless-mode network service (ISO 8473)," 2nd Edition, Nov. 15, 2002, 210 pages.

* cited by examiner

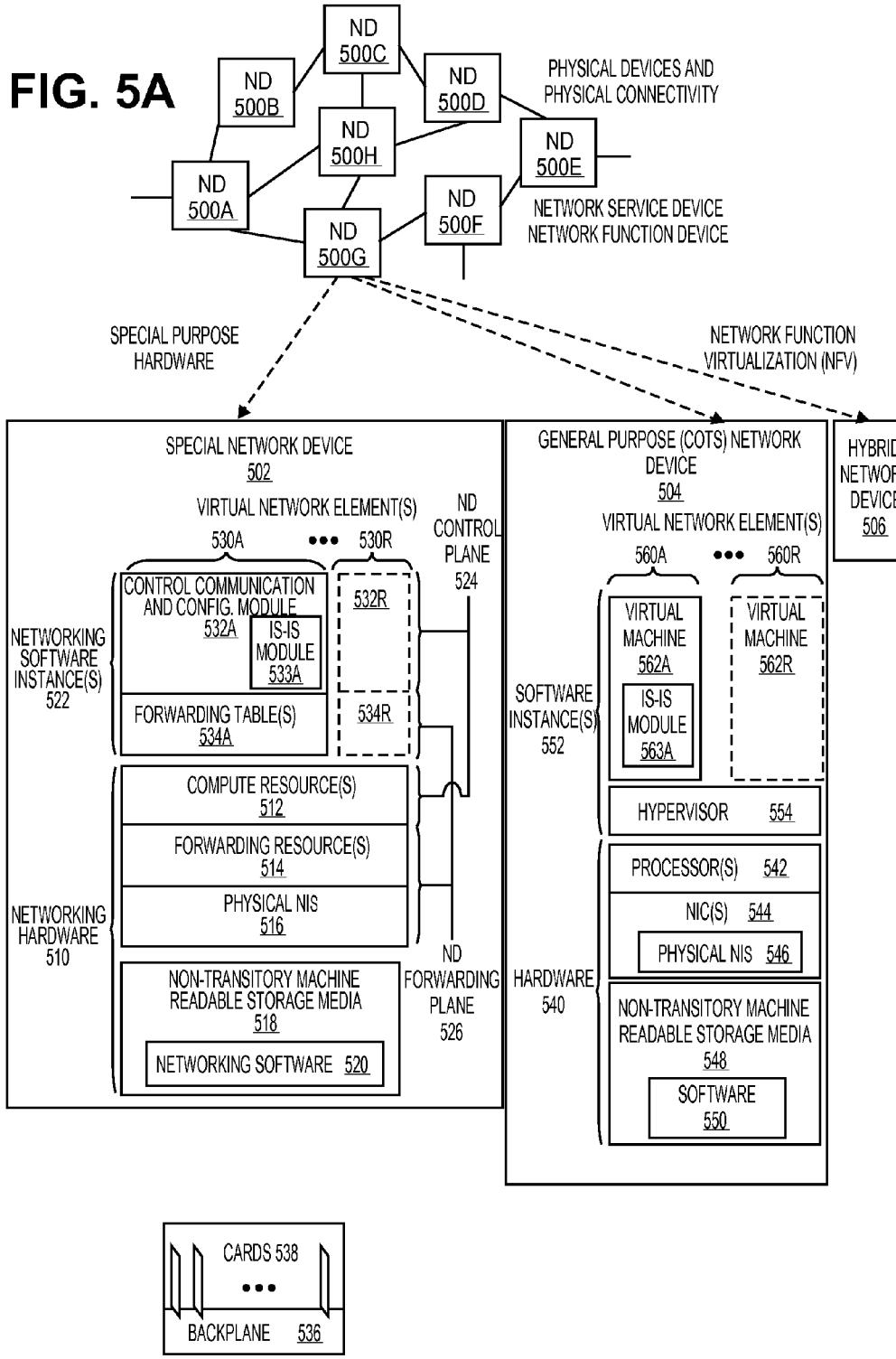

OPTIMIZATION TO EXPAND IS-IS LEAF NODES DURING LFA COMPUTATION

FIELD

Embodiments of the invention relate to the intermediate system to intermediate system (IS-IS) protocol, an interior gateway protocol (IGP) loop free alternative (LFA) computation. More specifically, the embodiments relate to the method and system to improve LFA computation efficiency by reducing the expansion of leaf nodes during the LFA computation by identifying neighbors that do not offer better protection to a destination node and not expanding the leaf nodes of the neighbor.

BACKGROUND

An Interior Gateway Protocol (IGP) is a type of protocol used for exchanging routing information between gateways (i.e., network devices) within a network including a set of commonly controlled gateways (e.g., a set of corporate local area networks); this network can be referred to as an autonomous system. The exchanged routing information can be used to forward data across the autonomous system using network-level protocols like the Internet Protocol (IP).

Specific examples of IGPs include open shortest path first (OSPF), intermediate system to intermediate system (IS-IS), and routing information protocol (RIP). IGPs are not responsible for routing or exchanging routing information outside of their respective autonomous systems. Exterior or border gateway protocols are used to exchange routing information between autonomous systems and rely on IGPs to resolve routes within an AS.

IS-IS protocol determines a set of paths from each network device in the autonomous system to each other network device in the autonomous system. A primary path is determined at each network device and the next hop to the destination is installed in the forwarding tables of the network device. However, in the case of failure of a next hope device or link a secondary or alternative path is also determined to be utilized in the case of failure until the network device can recalculate a primary path based on the changed topology of the network. RFC 5286 [Basic Specification for IP Fast Reroute: Loop Free Alternatives] lays out a method to compute Loop Free Alternatives (LFA) that is applicable to the intermediate system-intermediate system (IS-IS) protocol. RFC 5286 defines a set of criteria that a next hop must meet to be eligible and selected as a next hop for an LFA path.

Each time a node is encountered while calculating the shortest path tree (SPT) during the LFA computation, where the SPT is either rooted at the source node or at a neighbor node of the source node, all the link state protocol messages (LSPs) of that node are expanded and each inherits the next hop computed for that node (i.e. the source or neighbor node). This 'inheriting' process includes assigning the next hop of the node to all the unique prefixes advertised from this node. This expansion of the LSPs incurs cost not only to expand all the fragments of the LSP but more importantly to look up the reachable prefix in the local routing information base (local RIB) and 'inherit' the next hop of this node.

SUMMARY

A method is implemented by a network device in a network having a plurality of nodes. The method to compute a loop free alternative (LFA) next hop as a backup for a primary path next hop for intermediate system-intermediate system (IS-IS). The method improves LFA computation efficiency by minimizing expansion of prefixes. The method includes selecting a next candidate next hop from a set of neighbor next hops in the network to perform an LFA shortest path first (SPF) computation with the a neighbor node represented by the next candidate next hop as a root, selecting a next LFA SPF destination node in the network, computing LFA for the next LFA SPF destination node, and checking whether the next candidate next hop provides link or node protection for the next LFA SPF destination node or the next LFA SPF destination node has a multi-homed prefix. The method further includes checking whether the next candidate next hop provides better protection than a current LFA next hop for the next LFA SPF destination node or the next LFA SPF destination node has a multi-homed prefix, and expanding all prefixes of the next LFA SPF destination node and inherit the next candidate next hop as the current LFA next hop where the next candidate next hop provides link or node protection and better protection than the current LFA next hop.

A network device in a network having a plurality of nodes. The network device is configured to execute a method to compute a loop free alternative (LFA) next hop as a backup for a primary path next hop for intermediate system-intermediate system (IS-IS), where the method improves LFA computation efficiency by minimizing expansion of prefixes. The network device includes a non-transitory machine-readable storage medium to store an IS-IS module. The network device also includes a network processor communicatively coupled to the non-transitory machine-readable storage medium. The network processor executes the IS-IS module. The IS-IS module is configured to select a next candidate next hop from a set of neighbor next hops in the network to perform an LFA shortest path first (SPF) computation with the a neighbor node represented by the next candidate next hop as a root, to select a next LFA SPF destination node in the network, to compute LFA for the next LFA SPF destination node, and to check whether the next candidate next hop provides link or node protection for the next LFA SPF destination node or the next LFA SPF destination node has a multi-homed prefix. The IS-IS module is further configured to check whether the next candidate next hop provides better protection than a current LFA next hop for the next LFA SPF destination node or the next LFA SPF destination node has a multi-homed prefix, and to expand all prefixes of the next LFA SPF destination node and inherit the next candidate next hop as the current LFA next hop where the next candidate next hop provides link or node protection and better protection than the current LFA next hop.

A control plane device is configured to implement at least one centralized control plane for a software defined network (SDN). The centralized control plane is configured to execute a method to compute a loop free alternative (LFA) next hop as a backup for a primary path next hop for intermediate system-intermediate system (IS-IS), where the method improves LFA computation efficiency by minimizing expansion of prefixes. The control plane device comprises a non-transitory machine-readable storage medium to store an IS-IS module, and a network processor communicatively coupled to the non-transitory machine-readable storage medium. The network processor executes the IS-IS module. The IS-IS module is configured to select a next candidate next hop from a set of neighbor next hops in the network to perform an LFA shortest path first (SPF) computation with the a neighbor node represented by the next candidate next hop as a root, to select a next LFA SPF destination node in the network, to compute LFA for the next LFA SPF destination node, and to check whether the next candidate next hop provides link or node protection for the next LFA SPF destination node or the next LFA SPF destination node has a multi-homed prefix. The IS-IS module is further configured to check whether the next candidate next hop provides better protection than a current LFA next hop for the next LFA SPF destination node or the next LFA SPF destination node has a multi-homed prefix, and to expand all prefixes of the next LFA SPF destination node and inherit the next candidate next hop as the current LFA next hop where the next candidate next hop provides link or node protection and better protection than the current LFA next hop.

A computing device implements a plurality of virtual machines for implementing network function virtualization (NFV), wherein a virtual machine from the plurality of virtual machines is configured to execute a method to compute a loop free alternative (LFA) next hop as a backup for a primary path next hop for intermediate system-intermediate system (IS-IS), where the method improves LFA computation efficiency by minimizing expansion of prefixes. The computing device includes a non-transitory machine-readable storage medium to store an IS-IS module, and a network processor communicatively coupled to the non-transitory machine-readable storage medium. The network processor executes the IS-IS module. The IS-IS module is configured to select a next candidate next hop from a set of neighbor next hops in the network to perform an LFA shortest path first (SPF) computation with the a neighbor node represented by the next candidate next hop as a root, to select a next LFA SPF destination node in the network or the next LFA SPF destination node has a multi-homed prefix, to compute LFA for the next LFA SPF destination node, and to check whether the next candidate next hop provides link or node protection for the next LFA SPF destination node. The IS-IS module to check whether the next candidate next hop provides better protection than a current LFA next hop for the next LFA SPF destination node or the next LFA SPF destination node has a multi-homed prefix, and to expand all prefixes of the next LFA SPF destination node and inherit the next candidate next hop as the current LFA next hop where the next candidate next hop provides link or node protection and better protection than the current LFA next hop.

BRIEF DESCRIPTION OF THE DRAWINGS

The invention may best be understood by referring to the following description and accompanying drawings that are used to illustrate embodiments of the invention. In the drawings:

FIG. 5A illustrates connectivity between network devices (NDs) within an exemplary network, as well as three exemplary implementations of the NDs, according to some embodiments of the invention.

FIG. 5B illustrates an exemplary way to implement the special-purpose network device 502 according to some embodiments of the invention.

DESCRIPTION OF EMBODIMENTS

Figure 1:
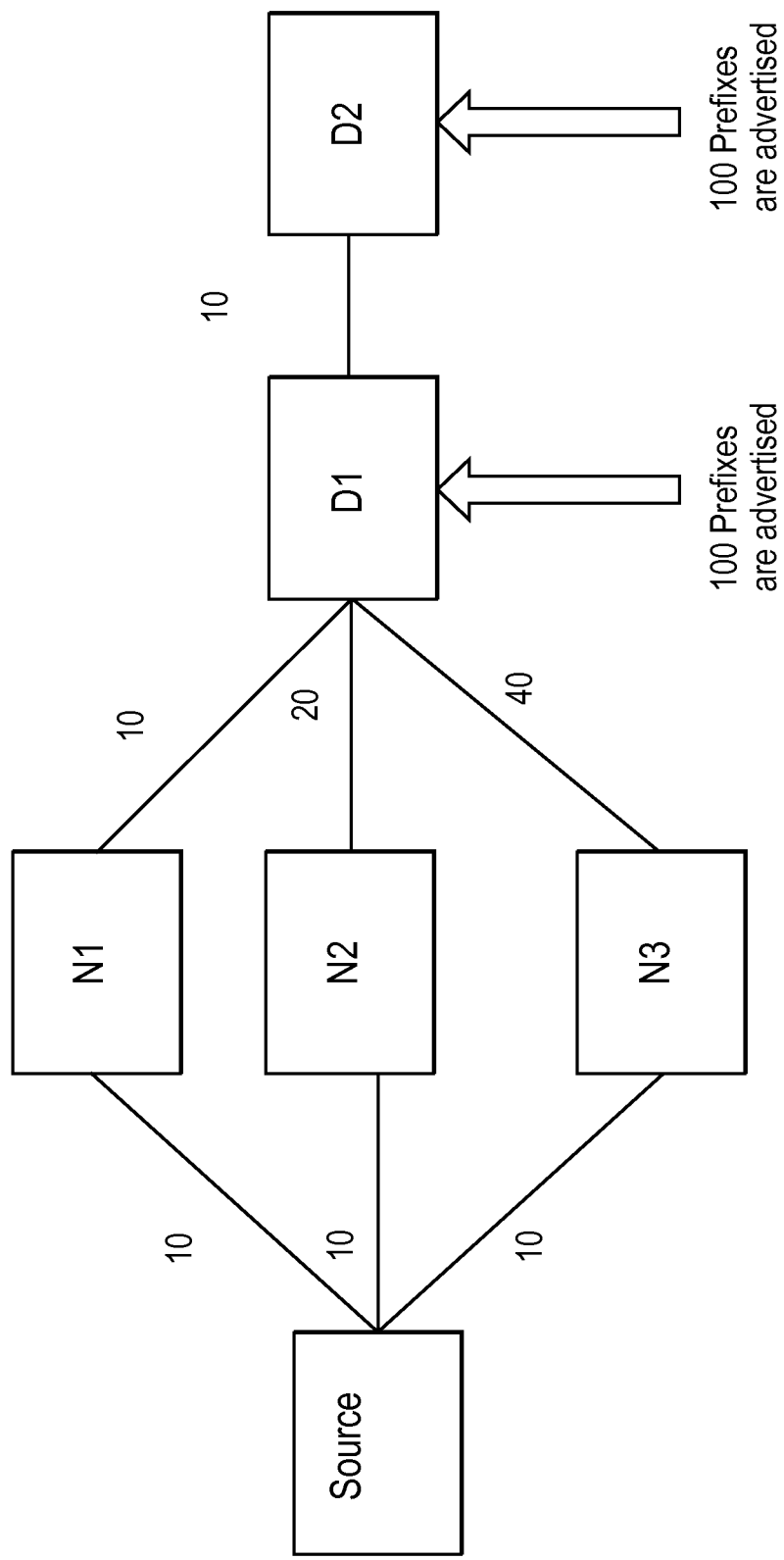
FIG. 1 is a diagram of one embodiment of a network topology where an alternate LFA is desired.

The following description describes methods and apparatus for computation of LFA for an interior gateway protocol (IGP) in an autonomous system. In particular, the method and system relate to process and system for improving the efficiency of the LFA computation of the intermediate system-intermediate system (IS-IS) IGP for either Internet Protocol version 4 (IPv4) or Internet Protocol version 6 (IPv6). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The processes for calculating the LFA for autonomous systems implementing IS-IS described herein below can be applied for Internet Protocol version 4 (IPv4) and/or Internet Protocol version 6 (IPv6) routes and topologies. The process can be applied to each (IPv4 and IPv6) in any order or in parallel. The processes for handling each (IPv4 and IPv6) are similar and for sake of clarity are not separately addressed.

FIG. 1 is a diagram of one embodiment of a network topology where an LFA is to be computed. In the illustrated network each node is represented with a corresponding name (e.g., source S, intermediate nodes N1, N2 and N3, and destination nodes D1 and D2) and the link costs are represented above each link connecting two nodes. It should be assumed for this example that all link costs are bi-directional. In this example, both the destination nodes D1 and D2 advertise 100 unique prefixes (referred to herein as D1P1-D1P100 and D2P1-D2P100, i.e. the first prefix (P1) for destination node D1 is referred to as D1P1 and the $100^{th}$ prefix is D1P100) into the autonomous system (AS), in this example an IS-IS domain.

During a primary shortest path first (SPF) computation (e.g., as defined in ISO 10589 Appendix F) at node S, a set of paths to each other node in the network topology is determined. In this example, to reach destination node D1 the next hop of the primary path would be N1 and the total cost of the primary path is 20 (10+10). Similarly, the next hop of the primary for reaching D2 would also be N1 where the total cost of the path would be 30 (10+10+10). Thus, at the source node S the forwarding table would include an entry for destination node D1: D1→N1 (cost 20), where the '→' indicates that the next hop of the primary path is N1 and an entry for destination node D2: D2→N1 (cost 30). Similarly, all of the prefixes of D1 and D2, D1P1-D1P100 and D2P1-D2P100 will have similar entries in the forwarding table where the next hop N1 and cost will be inherited by all of these prefixes.

After SPF is utilized to identify the primary path and its next hop, a loop free alternative (LFA) path and its next hop can be determined. While computing LFAs, as described in RFC 5286 Section 3.6, both D1 and D2 will have N2 as a node protecting LFA. RFC 5286 defines a set of conditions that the candidate alternative paths must meet to be identified as a valid LFA. One condition is the basic loop free condition, which can be expressed as $(N, D) < (N, S) + (S, D)$, where the parentheticals indicate a function $(x, y)$ that determines a number of hops or distance from node x to node y. Thus, the basic loop free condition is met when the distance from the candidate node N to the destination node D is less than the combined distance from the candidate node (N) to the source node (S) and the distance from the source node to the destination node. This condition ensures that the path from the candidate node is not long enough to have any loops back to the source node. An additional condition can identify whether a candidate node N provides node protection to the primary path. The node protection condition $(N, D) < (N, E) + (E, D)$ (where E is the primary next hop for the destination) is utilized to differentiate LFAs that are only link protecting from those that are also node protecting, with node protection preferred over link only protection.

In this regard, it should be noted for this example topology N3 didn't offer any LFA to nodes D1 and D2, because the basic loop free condition is not satisfied. This result is obtained by performing the SPF computation rooted at neighbor N2 and rooted at neighbor N3 and expanding the complete network. It can be seen that for neighboring node N3 applying the basic loop free condition yields for D1 40<10+20, which is false and for D2 40<10+30, which is also false. Whereas neighboring node N2 can offer link protection and node protection; as both of these conditions are satisfied.

In executing the LFA computation as defined by RFC 5286, however, the calculation and expansion of the leaf nodes of N3 would be carried out regardless of the lack of protection N3 provides in light of the identification of N2 as a candidate LFA. Generally, each time a node is encountered while calculating the SPT rooted at the source node or at the neighbor node all of the LSPs for that node are expanded and the next hop computed for the node is inherited by the unique prefixes of the node. This incurs a computational cost not only to expand all of the LSP fragments, but also the lookup of the reachable prefix in the local RIB to inherit the next hop. The embodiments of the present invention overcome this inefficiency of the prior art.

The embodiments, during the computation of the LFA SPT (i.e. during the LFA SPF computation) recognize neighbor nodes that do not offer any LFA or offer an inferior LFA protection than what has previously been identified for a given destination node and avoid the expansion of the leaf nodes and the LSP fragments of the node thereby improving the computational efficiency of the LFA calculation.

Applying the embodiments with the improved efficiency to the example topology of FIG. 1, while computing the LFA SPF rooted at N2 the process encounters destination node D1. Both the loop free condition (i.e. as discussed above and as set forth in In-equality-1 in RFC 5286) and node protection condition (i.e., as discussed above and as set for in In-equality-3 in RFC 5286) are satisfied and hence N2 will be stored as a node protecting LFA for D1.

After the process stores N2 as the 'current' LFA next hop for D1, then all D1's LSP fragments are expanded to ensure that all D1P1-D1P100 are stored in local RIB and the corresponding primary next hop of these prefixes is the same as D1's primary next hop, which in this example is N1. After this check is made, then D1's LFA next hop (i.e., N2) would be inherited to all 100 of these prefixes. It should be understood that both the LSP database and the local RIB need to be consulted to check all of D1's LSP fragments and to lookup the corresponding reachable prefix advertised by D1 in the local RIB.

The process then continues on to perform the same checks and processing for the next destination D2 and its prefixes D2P1-D2P100 as is describe with relation to the processing of D1. With the processing of both destinations all of the 200 prefixes of D1 and D2 will have a valid LFA next hop which is N2, because it meets the loop free condition and node protection conditions of RFC 5286. The LFA SPF computation rooted at N2 will complete and the LFA computation process will continue to the next neighbor node, which in this case is N3.

The LFA SPF computation then continues from neighboring node N3, where it will construct an SPT rooted at N3 that encounters D1. However, when analyzing node N3 with regard to D1, the node N3 doesn't satisfy the loop free condition (e.g., In-equality-1 in RFC 5286) and hence N3 doesn't provide any alternative to D1. At this point there is no need to expand D1's LSP fragments to get all reachable prefixes. Rather, the process can terminate the analysis of this node and continue on with the LFA SPF computation. Similarly, the next node encountered in this LFA SPF computation rooted at node N3 would be D2 and again the basic loop free condition (e.g., In-equality-1 in RFC 5286) is not satisfied and hence D2's LSP fragments need not be expanded. The LFA SPF process would then continue on to other nodes, if any.

Implementing the process to not expand the LSPs for node N3 yields significant computation savings in typical networks where nodes advertise a large number of reachable prefixes. In some embodiments, the avoidance of expanding the LSPs of D1 and D2 applies regardless of whether the destination nodes D1 and D2 at that point have any current LFA next hop stored or not. This process is described in further detail herein below with regard to FIG. 2.

Figure 2:
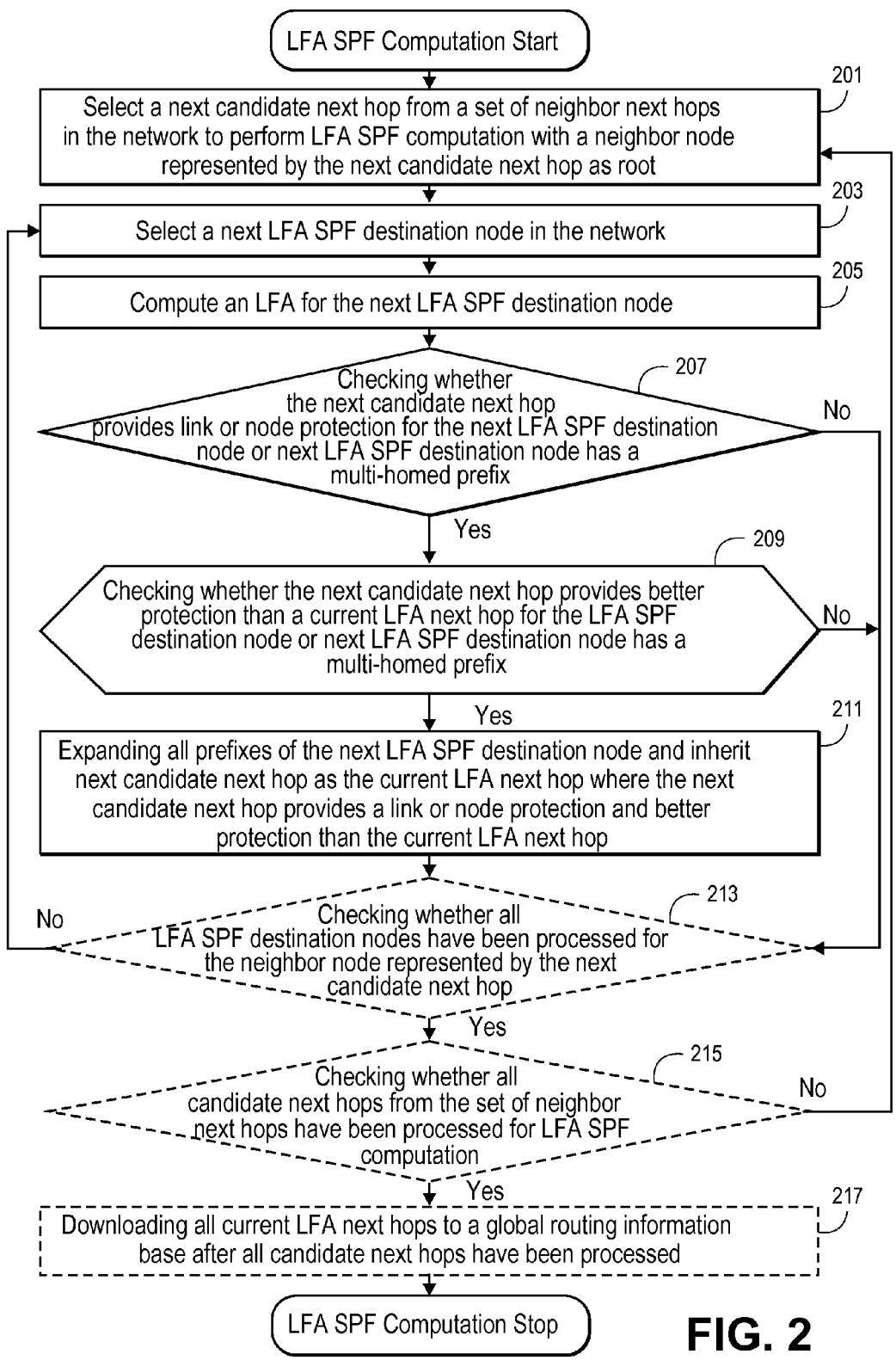
FIG. 2 is a flowchart of one embodiment of a LFA computation process for routes in an autonomous system that improves efficiency by identification of scenarios where LSP expansion can be avoided.

FIG. 2 is a flowchart of one embodiment of a LFA computation process for IS-IS having an improved computational efficiency. In one embodiment, the LFA SPF computation process starts after the completion of the primary path computations. The process is executed by the source node to find LFAs to each destination in the AS such as an IS-IS domain. The process iterates through the set of neighboring nodes, refer to herein as the neighbor next hops. The process selects a next candidate next hop from a set of neighbor next hops in the network where the neighbor node represented by the selected candidate next hop will be set as the root for the LFA SPF computation (Block 201). The 'LFA SPF' computation is the SPF computation for determining an LFA, in contrast to the SPF computations utilized to determine the primary path next hops. The set of neighbor next hops can be traversed in any order or in the order specified by IS-IS. The LFA SPF computation determines a shortest path tree (SPT) from the root to all other nodes in the network.

The process continues with selection of a next LFA SPF destination node in the network (Block 203). The destination nodes can be traversed in any order or as specified by IS-IS. Each other node in the SPT other than the source node and the neighbor node can be a destination node. With the LFA SPF destination node selected, the LFA for the LFA SPF destination node can be computed (Block 205) by applying the criteria of RFC 5286. A check can then be made whether the candidate next hop provides link or node protection for the LFA SPF destination node or the next LFA SPF destination node has a multi-homed prefix (Block 207). If the next candidate node does not provide link or node protection or has a multi-homed prefix, then the process proceeds to check whether additional LFA SPF destination nodes remain to be processed for the neighbor node represented by the candidate next hop (Block 213). If additional LFA SPF destination nodes remain to be processed then the next LFA SPF destination node is selected (Block 203). If all LFA SPF destination nodes have been processed for the candidate next hop, then a check is made whether all candidate next hops from the set of neighbor next hops have been processed for the LFA SPF computation (Block 215). If all of the candidate next hop nodes have not been processed, then the next candidate next hop node is selected (Block 201). If all of the candidate next hop nodes have been processed then the current LFA next hops for all LFA SPF destination nodes are downloaded to the global routing information base (Block 217) and the process completes.

If the candidate next hop does provide link or node protection and doesn't have a multi-homed prefix (Block 207), then the process continues with a check of whether the candidate next hop provides better protection than a current LFA next hop for the LFA SPF destination node or has a multi-homed prefix (Block 209). If the next candidate node does not provide better protection or has a multi-homed prefix, then the process proceeds to check whether additional LFA SPF destination nodes remain to be processed for the neighbor node represented by the candidate next hop (Block 213). If additional LFA SPF destination nodes remain to be processed then the next LFA SPF destination node is selected (Block 203). If all LFA SPF destination nodes have been processed for the candidate next hop, then a check is made whether all candidate next hops from the set of neighbor next hops have been processed for the LFA SPF computation (Block 215). If all of the candidate next hop nodes have not been processed, then the next candidate next hop node is selected (Block 201). If all of the candidate next hop nodes have been processed then the current LFA next hops for all LFA SPF destination nodes are downloaded to the global routing information base (Block 217) and the process completes.

If the candidate next hop node does provide better protection and doesn't have a multi-homed prefix (Block 209), then the process expands all prefixes of the LFA SPF destination node and the candidate next hop is inherited as the current LFA next hop for all of these prefixes (Block 211). Then the process proceeds to check whether additional LFA SPF destination nodes remain to be processed for the neighbor node represented by the candidate next hop (Block 213). If additional LFA SPF destination nodes remain to be processed then the next LFA SPF destination node is selected (Block 203). If all LFA SPF destination nodes have been processed for the candidate next hop, then a check is made whether all candidate next hops from the set of neighbor next hops have been processed for the LFA SPF computation (Block 215). If all of the candidate next hop nodes have not been processed, then the next candidate next hop node is selected (Block 201). If all of the candidate next hop nodes have been processed then the current LFA next hops for all LFA SPF destination nodes are downloaded to the global routing information base (Block 217) and the process completes.

Figure 3:
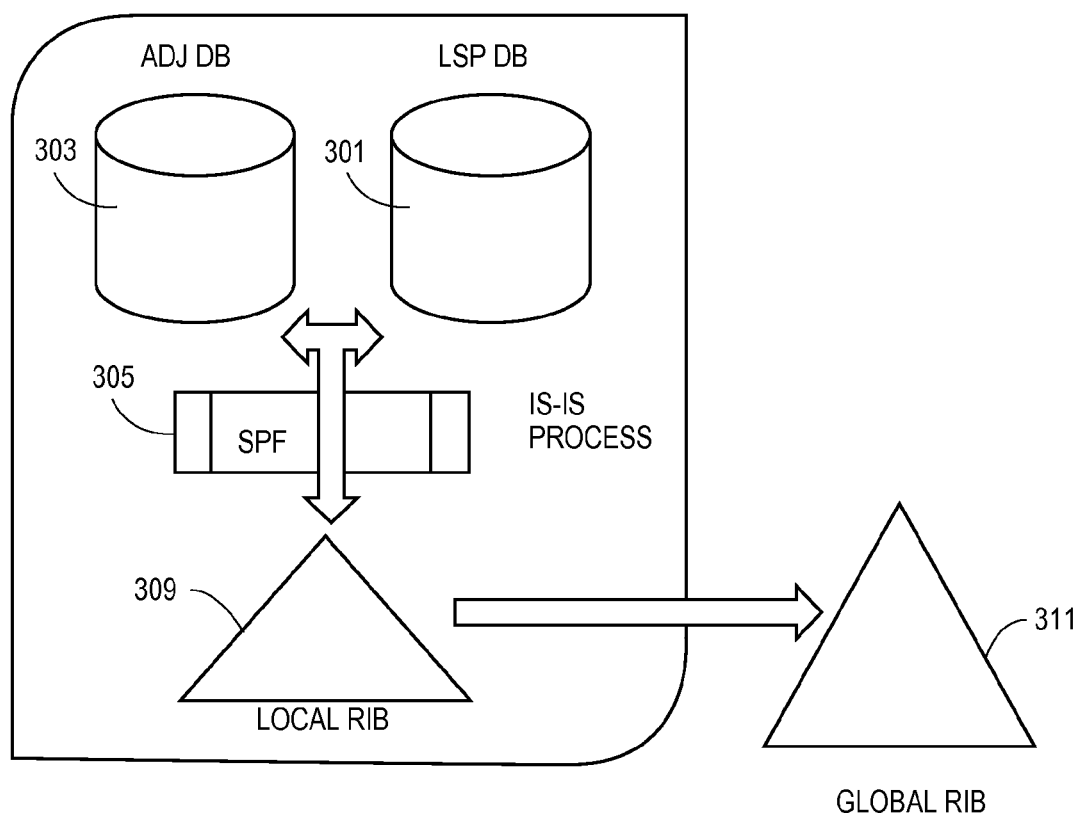
FIG. 3 is a diagram of the basic components of the IS-IS process.

FIG. 3 is a diagram of the basic components of the IS-IS process. The components of the network device that are utilized in the IS-IS process include an adjacency (ADJ) database 303, a link state protocol (LSP) database 301, a shortest path first (SPF) 305 or similar routing process, and a local RIB 309. The adjacency database 303 tracks adjacency information received from neighboring nodes connected through the physical ports and links of the network device. The link state protocol database 301 tracks the topology of the network or autonomous system in which the network device is situated, which is based on exchange of link state packets. A shortest path first 305 or similar route computation algorithm processes the link state protocol database 301 to determine forwarding information that is stored in the local routing information base 309. In some embodiments, the local routing information base is synchronized or downloaded to a global routing information base 311 that is shared by all components of the network device such as line cards and similar components or that may be shared with other network devices in the network or autonomous system.

After forming adjacencies (ADJ DB) with neighboring nodes and acquiring/synchronizing the LSP database (LSP DB) of the network node, i.e., the source node, will perform an IS-IS decision process. The IS-IS decision process as specified in the IS-IS ISO 10589 Appendix F.2 specification would result in the local RIB of reachable prefixes of the network with the property of loop free, shortest path to the source node computing. All the paths computed and stored in local RIB will be eventually downloaded to the global RIB, which eventually installs the best routes in the forwarding tables (not shown).

The SPF algorithm used for computing the routes is based on the Dijkstra's Algorithm with extensions for computing equal cost paths as specified in the IS-IS ISO 10589 Appendix F.2 specification. For the primary SPF the source node marked is the root node and shortest path entries to all nodes are computed from the source node. If and when a shortest path entry is identified, all the prefixes of the node would be expanded to have the routes in the local RIB.

The diagram is an illustration to show the storing of the computed prefixes in the local RIB, during the IS-IS decision process, which is important and this is where all the prefixes advertised by the nodes such as D1 and D2 from the above examples are stored during leaf node expansion of the corresponding LSP fragments.

Figure 4:
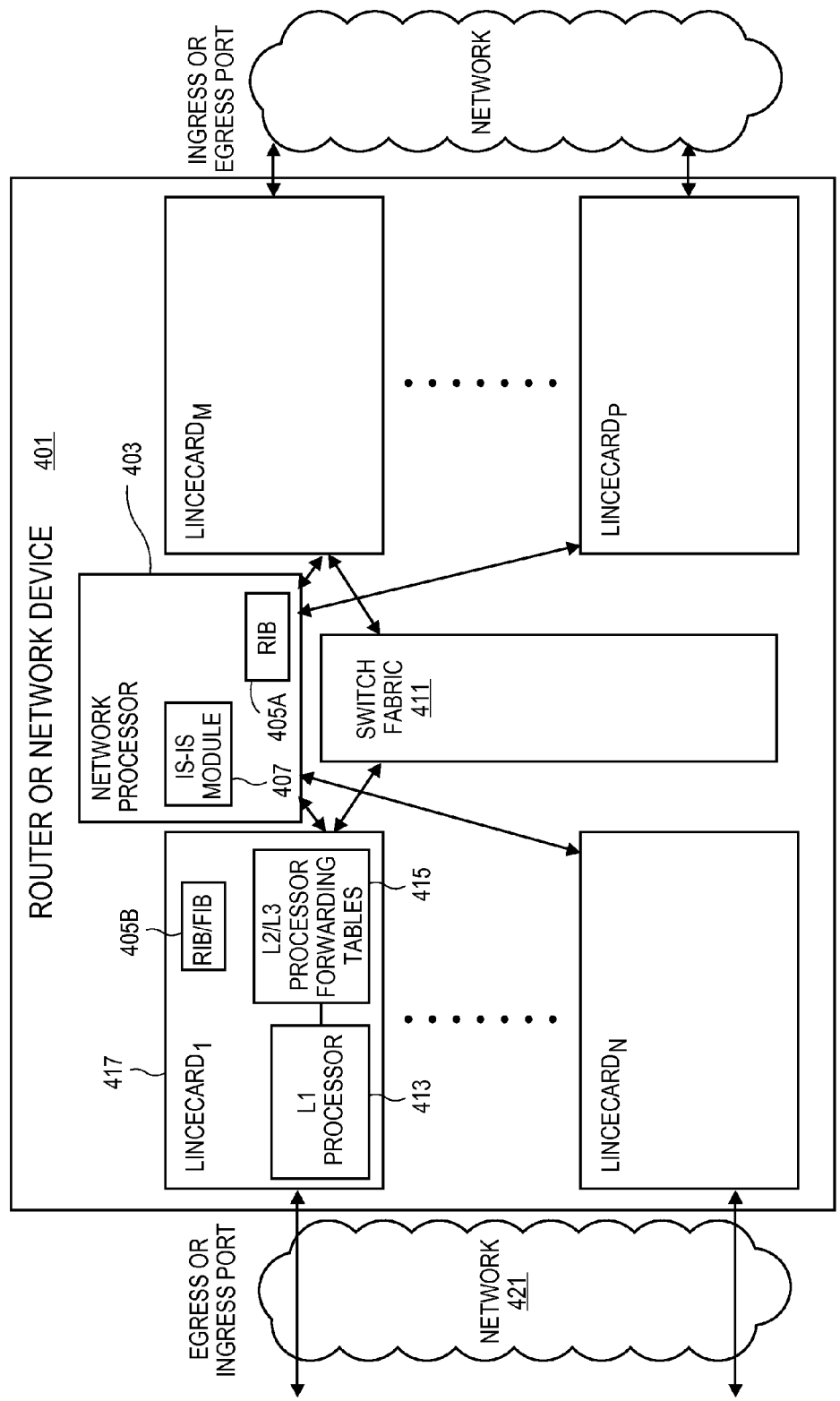
FIG. 4 is a diagram of one embodiment of a network device implementing the LFA computation process.

FIG. 4 is a diagram of one embodiment of a network device implementing the LFA computation process in an autonomous system.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 401 or network device or similar computing device. The router 401 can have any structure that enables it to receive data traffic and forward it toward its destination. The router 401 can include a network processor 403 or set of network processors that execute the functions of the router 401. A 'set,' as used herein, is any positive whole number of items including one item. The router 401 or network element can execute IS-IS and LFA computation functionality via a network processor 403 or other components of the router 401.

The IS-IS and LFA functions can be implemented as modules in any combination of software, including firmware, and hardware within the router. The functions of the IS-IS process that are executed and implemented by the router 401 include those described further herein above. In the illustrated example, the functions are implemented by the network processor 403 that executes an IS-IS module 407 along with the routing information base 405A.

In one embodiment, the router 401 can include a set of line cards 417 that process and forward the incoming data traffic toward the respective destination nodes by identifying the destination and forwarding the data traffic to the appropriate line card 417 having an egress port that leads to or toward the destination via a next hop. These line cards 417 can also implement the routing information base or forwarding information base 405B, or a relevant subset thereof. The line cards 417 can also implement or facilitate the IS-IS and LFA process functions described herein above. The line cards 417 are in communication with one another via a switch fabric 411 and communicate with other nodes over attached networks 421 using Ethernet, fiber optic or similar communication links and media.

In other embodiments, the processes can be implemented by a split-architecture node, where the control plane is remote from the data/forwarding plane. In this case, the IS-IS and LFA process can be carried out at any combination of the data plane nodes and the central controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A). The IS-IS module 533A implements the processes described herein above including LFA computation as part of the Control communication and Configuration Module 532A or similar aspect of the networking software, which may be loaded and stored in the non-transitory machine readable media 518 or in a similar location.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)).

By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate a hypervisor 554 (sometimes referred to as a virtual machine monitor (VMM)) and one or more virtual machines 562A-R that are run by the hypervisor 554, which are collectively referred to as software instance(s) 552. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 562A-R, and that part of the hardware 540 that executes that virtual machine (be it hardware dedicated to that virtual machine and/or time slices of hardware temporally shared by that virtual machine with others of the virtual machine(s) 562A-R), forms a separate virtual network element(s) 560A-R. In one embodiment, the virtual machines 532A-R may execute the described IS-IS module 563A and related software described herein above.

The virtual network element(s) 560A-R performs similar functionality to the virtual network element(s) 530A-R. For instance, the hypervisor 554 may present a virtual operating platform that appears like networking hardware 510 to virtual machine 562A, and the virtual machine 562A may be used to implement functionality similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 562A-R differently. For example, while embodiments of the invention are illustrated with each virtual machine 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 554 includes a virtual switch that provides similar forwarding services as a physical Ethernet switch. Specifically, this virtual switch forwards traffic between virtual machines and the NIC(s) 544, as well as optionally between the virtual machines 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 5C:
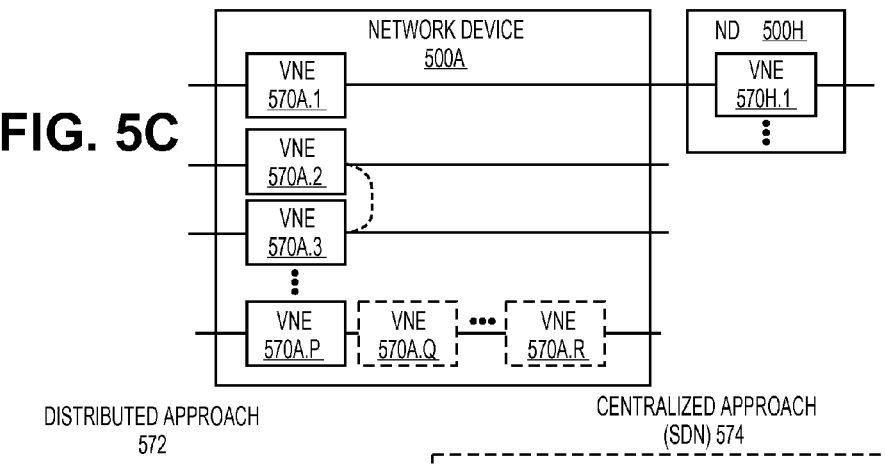
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the virtual machines 562A-R may operate as servers; the same would be true for the hybrid network device 506; in the case of the special-purpose network device 502, one or more such servers could also be run on a hypervisor executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 5D:
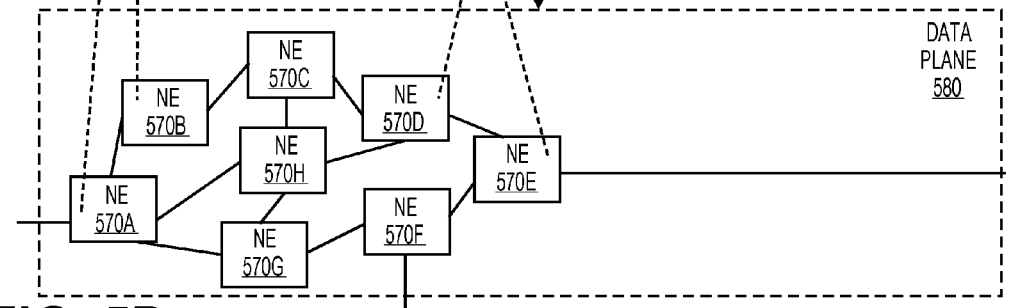
FIG. 5D illustrates a network with a single network element (NE) on each of the NDs of FIG. 5A, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the centralized reachability and forwarding information module 579 may include the IS-IS module 581 and related software as described herein above.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figures 5E, 5F:
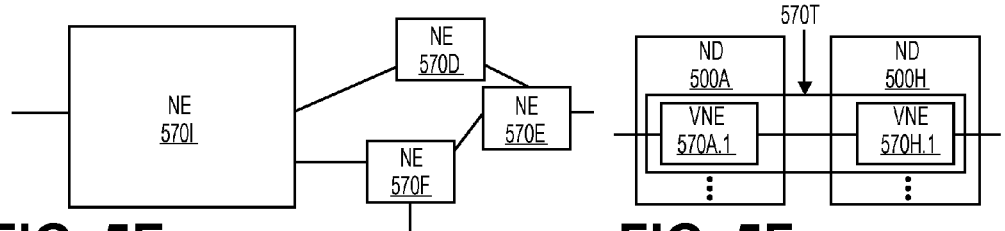
FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention.
FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
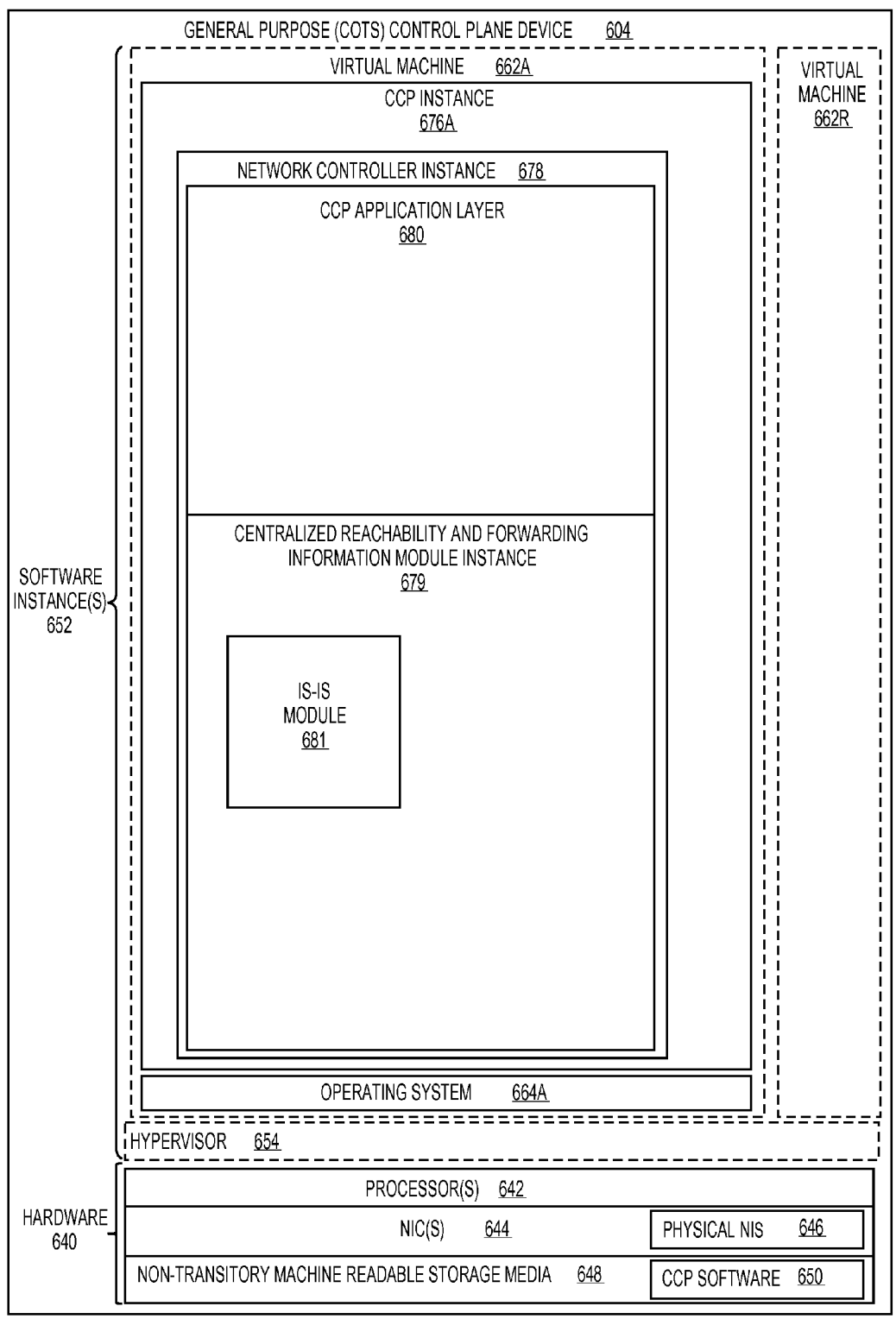
FIG. 6 illustrates a general purpose control plane device 604 including hardware 540 comprising a set of one or more processor(s) 542 (which are often Commercial off-the-shelf (COTS) processors) and network interface controller(s) 544 (NICs; also known as network interface cards) (which include physical NIs 546), as well as non-transitory machine readable storage media 548 having stored therein centralized control plane (CCP) software 550), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a hypervisor 654 (sometimes referred to as a virtual machine monitor (VMM)) and one or more virtual machines 662A-R that are run by the hypervisor 654; which are collectively referred to as software instance(s) 652. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 650 (illustrated as CCP instance 676A) on top of an operating system 664A are typically executed within the virtual machine 662A. In embodiments where compute virtualization is not used, the CCP instance 676A on top of operating system 664A is executed on the "bare metal" general purpose control plane device 604.

The operating system 664A provides basic processing, input/output (I/O), and networking capabilities. In some embodiments, the CCP instance 676A includes a network controller instance 678. The network controller instance 678 includes a centralized reachability and forwarding information module instance 679 (which is a middleware layer providing the context of the network controller 678 to the operating system 664A and communicating with the various NEs), and an CCP application layer 680 (sometimes referred to as an application layer) over the middleware layer (providing the intelligence required for various network operations such as protocols, network situational awareness, and user-interfaces). In one embodiment, the centralized reachability and forwarding information module 679 may include the IS-IS module 681 and related software as described herein above.

At a more abstract level, this CCP application layer 680 within the centralized control plane 676 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device in a network having a plurality of nodes, the method to compute a loop free alternative (LFA) next hop as a backup for a primary path next hop for intermediate system-intermediate system (IS-IS), where the method improves LFA computation efficiency by minimizing expansion of prefixes, the method comprising the steps of:
    selecting, by the network device, a next candidate next hop from a set of neighbor next hops in the network to perform an LFA shortest path first (SPF) computation with a neighbor node represented by the next candidate next hop as a root;
    selecting a next LFA SPF destination node in the network;
    computing, by the network device, LFA for the next LFA SPF destination node;
    checking whether the next candidate next hop provides link or node protection for the next LFA SPF destination node or the next LFA SPF destination node has a multi-homed prefix;
    checking whether the next candidate next hop provides better protection than a current LFA next hop for the next LFA SPF destination node or the next LFA SPF destination node has a multi-homed prefix;
    expanding all prefixes of the next LFA SPF destination node and inherit the next candidate next hop as the current LFA next hop where the next candidate next hop provides link or node protection and better protection than the current LFA next hop; and
    installing, by the network device, all LFA to a global routing information base of the network device after all candidate next hop nodes have been exhausted.

2. The method of claim 1, further comprising the step of: checking whether all LFA SPF destination nodes have been processed for the neighbor node represented by the next candidate next hop.

3. The method of claim 1, further comprising the step of: checking whether all candidate next hop nodes from the set of neighbor next hops have been processed for LFA SPF computation.

4. The method of claim 1, wherein the IS-IS is for internet protocol (IP) version 4.

5. The method of claim 1, wherein the IS-IS is for internet protocol (IP) version 6.

6. A network device in a network having a plurality of nodes, the network device configured to execute a method to compute a loop free alternative (LFA) next hop as a backup for a primary path next hop for intermediate system-intermediate system (IS-IS), where the method improves LFA computation efficiency by minimizing expansion of prefixes, the network device comprising:
    a non-transitory machine-readable storage medium to store an IS-IS module; and
    a network processor communicatively coupled to the non-transitory machine-readable storage medium, the network processor to execute the IS-IS module, the IS-IS module configured to select a next candidate next hop from a set of neighbor next hops in the network to perform an LFA shortest path first (SPF) computation with a neighbor node represented by the next candidate next hop as a root, to select a next LFA SPF destination node in the network, to compute LFA for the next LFA SPF destination node, to check whether the next candidate next hop provides link or node protection for the next LFA SPF destination node or the next LFA SPF destination node has a multi-homed prefix, to check whether the next candidate next hop provides better protection than a current LFA next hop for the next LFA SPF destination node or the next LFA SPF destination node has a multi-homed prefix, and to expand all prefixes of the next LFA SPF destination node and inherit the next candidate next hop as the current LFA next hop where the next candidate next hop provides link or node protection and better protection than the current LFA next hop.

7. The network device of claim 6, wherein the network processor is configured to execute the IS-IS module which is further configured to checking whether all LFA SPF destination nodes have been processed for the neighbor node represented by the next candidate next hop.

8. The network device of claim 6, wherein the network processor is configured to execute the IS-IS module which is further configured to check whether all candidate next hop nodes from the set of neighbor next hops have been processed for LFA SPF computation.

9. The network device of claim 6, wherein the IS-IS is for internet protocol (IP) version 4.

10. The network device of claim 6, wherein the IS-IS is for internet protocol (IP) version 6.

11. The network device of claim 6, wherein the network processor is configured to execute the IS-IS module which is further configured to download all LFA to a global routing information base after all candidate next hop nodes have been exhausted.

12. A control plane device configured to implement at least one centralized control plane for a software defined network (SDN), the centralized control plane configured to execute a method to compute a loop free alternative (LFA) next hop as a backup for a primary path next hop for intermediate system-intermediate system (IS-IS), where the method improves LFA computation efficiency by minimizing expansion of prefixes, the control plane device comprising:
 a non-transitory machine-readable storage medium to store an IS-IS module; and
 a network processor communicatively coupled to the non-transitory machine-readable storage medium, the network processor to execute the IS-IS module, the IS-IS module configured to select a next candidate next hop from a set of neighbor next hops in the network to perform an LFA shortest path first (SPF) computation with a neighbor node represented by the next candidate next hop as a root, to select a next LFA SPF destination node in the network, to compute LFA for the next LFA SPF destination node, to check whether the next candidate next hop provides link or node protection for the next LFA SPF destination node or the next LFA SPF destination node has a multi-homed prefix, to check whether the next candidate next hop provides better protection than a current LFA next hop for the next LFA SPF destination node or the next LFA SPF destination node has a multi-homed prefix, and to expand all prefixes of the next LFA SPF destination node and inherit the next candidate next hop as the current LFA next hop where the next candidate next hop provides link or node protection and better protection than the current LFA next hop.

13. The control plane device of claim 12, wherein the IS-IS is for internet protocol (IP) version 4.

14. The control plane device of claim 12, wherein the IS-IS is for internet protocol (IP) version 6.

15. A computing device implementing a plurality of virtual machines for implementing network function virtualization (NFV), wherein a virtual machine from the plurality of virtual machines is configured to execute a method to compute a loop free alternative (LFA) next hop as a backup for a primary path next hop for intermediate system-intermediate system (IS-IS), where the method improves LFA computation efficiency by minimizing expansion of prefixes, the computing device comprising:
 a non-transitory machine-readable storage medium to store an IS-IS module; and
 a network processor communicatively coupled to the non-transitory machine-readable storage medium, the network processor to execute the IS-IS module, the IS-IS module configured to select a next candidate next hop from a set of neighbor next hops in the network to perform an LFA shortest path first (SPF) computation with a neighbor node represented by the next candidate next hop as a root, to select a next LFA SPF destination node in the network or the next LFA SPF destination node has a multi-homed prefix, to compute LFA for the next LFA SPF destination node, to check whether the next candidate next hop provides link or node protection for the next LFA SPF destination node, to check whether the next candidate next hop provides better protection than a current LFA next hop for the next LFA SPF destination node or the next LFA SPF destination node has a multi-homed prefix, and to expand all prefixes of the next LFA SPF destination node and inherit the next candidate next hop as the current LFA next hop where the next candidate next hop provides link or node protection and better protection than the current LFA next hop.

16. The computing device of claim 15, wherein the IS-IS is for internet protocol (IP) version 4.

17. The computing device of claim 15, wherein the IS-IS is for internet protocol (IP) version 6.

* * * * *